(12) United States Patent
Parish et al.

(10) Patent No.: US 7,959,693 B2
(45) Date of Patent: Jun. 14, 2011

(54) COMBUSTION CATALYST CARRIERS AND METHODS OF USING THE SAME

(75) Inventors: W. Wesley Parish, Orem, UT (US); Michael D. Thompson, Alpine, UT (US)

(73) Assignee: Ferox, LLC, Orem, UT (US)

( * ) Notice: Subject to any disclaimer, the term of this patent is extended or adjusted under 35 U.S.C. 154(b) by 471 days.

(21) Appl. No.: 12/093,570

(22) PCT Filed: Nov. 17, 2006

(86) PCT No.: PCT/US2006/061055
§ 371 (c)(1), (2), (4) Date: May 14, 2008

(87) PCT Pub. No.: WO2007/062330
PCT Pub. Date: May 31, 2007

(65) Prior Publication Data
US 2008/0263940 A1    Oct. 30, 2008

Related U.S. Application Data

(60) Provisional application No. 60/738,188, filed on Nov. 18, 2005.

(51) Int. Cl.
*C10L 10/00* (2006.01)
(52) U.S. Cl. ............................................ 44/626; 44/354
(58) Field of Classification Search .................... 44/354, 44/626
See application file for complete search history.

(56) References Cited

U.S. PATENT DOCUMENTS

| | | | |
|---|---|---|---|
| 4,389,220 A | | 6/1983 | Kracklauer |
| 4,639,255 A | * | 1/1987 | Schuettenberg et al. ........ 44/342 |
| 4,692,170 A | * | 9/1987 | Santambrogio et al. ........ 44/333 |
| 4,908,045 A | * | 3/1990 | Farrar ............................... 44/361 |
| 5,266,082 A | * | 11/1993 | Sanders ............................ 44/357 |
| 5,299,746 A | * | 4/1994 | Thuenker et al. ................ 241/36 |
| 6,353,143 B1 | * | 3/2002 | Fang et al. ......................... 585/1 |
| 6,456,217 B1 | * | 9/2002 | Esaki ............................. 341/143 |
| 6,488,725 B1 | | 12/2002 | Vincent et al. |
| 2003/0084858 A1 | | 5/2003 | Kracklauer |
| 2004/0172876 A1 | * | 9/2004 | Sprague et al. .................. 44/358 |
| 2005/0081430 A1 | | 4/2005 | Carroll et al. |

FOREIGN PATENT DOCUMENTS

| | | |
|---|---|---|
| CN | 1 184 146 | 6/1998 |
| EP | 1 512 736 A1 | 3/2005 |
| GB | 737 092 | 9/1955 |
| WO | WO 99/36488 A1 | 7/1999 |
| WO | WO 9936488 A1 * | 7/1999 |
| WO | WO 2007/062330 A1 | 5/2007 |

OTHER PUBLICATIONS

Supplementary European Search Report for corresponding EP Application No. 06846343.9, dated Jul. 14, 2010 (5 pages).

Examiner's First Report for corresponding AU Application No. 2006318235, dated Jul. 26, 2010 (3 pages).

* cited by examiner

*Primary Examiner* — Glenn A Caldarola
*Assistant Examiner* — Ming Cheung Po
(74) *Attorney, Agent, or Firm* — Ryan L. Marshall; Brinks Hofer Gilson & Lione

(57) ABSTRACT

Compositions including an iron containing fuel additive and a solid carrier are disclosed. Methods of preparing tablet forms of the compositions are also disclosed. The iron containing fuel additive may be ferrocene and/or substituted ferrocene derivatives. The compositions are useful for handling and rapidly solvating the iron containing fuel additive in a fuel such as gasoline.

14 Claims, No Drawings

COMBUSTION CATALYST CARRIERS AND METHODS OF USING THE SAME

CROSS REFERENCE TO RELATED APPLICATIONS

The present patent document claims the benefit of priority to PCT Patent Application No. PCT/US2006/061055, filed Nov. 17, 2006, and entitled "COMBUSTION CATALYST CARRIERS AND METHODS OF USING THE SAME," and claims the benefit of the filing date under 35 U.S.C. §119(e) of Provisional U.S. Patent Application Ser. No. 60/738,188, filed Nov. 18, 2005, the entire contents of each of which are incorporated herein by reference.

BACKGROUND OF THE INVENTION

1. Technical Field of the Invention

This invention relates to iron containing fuel additive compositions and methods of preparing the same.

Increasingly, fuel sources are augmented with a variety of additives to enhance many aspects of burning and combustion processes. Iron containing fuel additives have been found useful for such purposes. A problem frequently encountered in the addition of fuel additives is the difficulty in handling the additive before and during fuel supplementation. For example, iron containing fuel additives can be highly insoluble and fail to both produce the desired enhancement and cause additional undesirable effects, such as fuel line occlusion. There is therefore a need for improved fuel additives.

2. Brief Summary of the Invention

The present invention is directed to compositions and methods for preparing those compositions that can be more easily handled, improve an additive's salvation in fuel, and promote achieving the fuel additives' enhancement without occluding fuel lines. Such a composition can be rapidly soluble when added to a fuel or when fuel is added to a storage tank. Rapid solubility would promote homogenous blending of the iron containing fuel additive. A solid composition before dissolution can be advantageous over liquid compositions for ease of application and storage.

DETAILED DESCRIPTION OF THE INVENTION

Definitions

As used herein, the term "lower alkyl" means a straight chain or branched alkyl group of from 1 to 6 carbon (C1-C6) atoms. Examples include: methyl, ethyl, 1-propyl and 2-propyl, 1-butyl, 2-butyl, 2-methyl-1-propyl, 1,1-dimethylethyl, 1-pentyl, 2-pentyl, 3-pentyl, 2-methyl-1-butyl, 3-methyl-1-butyl, 2,2-dimethylpropyl, 1-hexyl, 2-hexyl, 3-hexyl, 2-methyl-1-pentyl, 3-methyl-1-pentyl, 4-methyl-1-pentyl, 3,3-dimethyl-1-butyl, 3,3-dimethyl-2-butyl, 2-ethyl-1-butyl and the like.

As used herein, the term "longer length alkyl" means a straight chain or branched alkyl group of from 7 to 12 carbon atoms. Examples include: C7-C12 such as: 1-heptyl, 2-heptyl, 3-heptyl, 4-heptyl, 2-methyl-1-hexyl, 4-methyl-1-hexyl, 5-methyl-1-hexyl, 1-octyl, 2-octyl, 3-octyl, 4-octyl, 6-methyl-1-heptyl, 5,5-dimethyl-1-hexyl, 2-ethyl-1-hexyl, 2-methyll-1-heptyl, 2-propyl-1-pentyl, 1-nonyl, 2-nonyl, 2-ethyl-2-methyl-1-hexyl, 4-methyl-1-octyl, 3,5,5-trimethyl-1-hexyl, 1-decyl, 2-decyl, 4-ethyl-1-octanyl, 2-methyl-1-nonyl, 4-methyl-1-nonyl, 8-methyl-1-nonyl, 1-undecyl (1-hendecyl), 2-undecyl, 7-methyl-1-decyl, 1-dodecyl, 5-dodecyl, 2-butyl-1-octyl, 10-methyl-1-undecyl, and the like.

As used herein, the term "alkyl" means a straight chain or branched alkyl group of from 1 to 12 carbon atoms. Examples include those provided for lower alkyl and longer length alkyl and the like.

As used herein, the term "cycloalkyl" means a monocyclic or polycyclic hydrocarbyl group. Illustrative examples include cyclopropyl, cycloheptyl, cyclooctyl, cyclodecyl, cyclobutyl, adamantyl, norpinanyl, decalinyl, norbornyl, cyclohexyl, and cyclopentyl. Cycloalkyl groups may be unsubstituted or substituted.

The term "aryl" means an aromatic carbocyclic ring having from 6 to 14 carbon atoms. Illustrative examples of an aryl group or radical include phenyl, 1-naphthyl, 2-naphthyl, 1-anthryl, 2-antryl, 9-anthryl, 1-phenanthryl, 2-phenanthryl, 3-phenanthryl, 4-phenanthryl, 5-phenanthryl, and the like; including fused ring systems with rings that have less than 6 carbons such as 1-acenaphthyl, 3-acenaphthyl, 4-acenaphthyl, 5-acenaphthyl, 1-azulyl, 2-azulyl, 4-azulyl, 5-azulyl, 6-azulyl and the like. Aryl groups may be unsubstituted or substituted.

As used herein, the term "alkoxy" means an alkyl group bonded to an oxygen atom where alkyl has the meaning as defined above. Representative examples of alkoxy groups include methoxy, ethoxy, tert-butoxy, propoxy, and isobutoxy and include the (C1-C12)alkoxy groups.

As used herein, the term "acyl" or "ketone" means a group derived from an organic acid (—COOH) by substituting the hydroxy group (—OH) with alkyl, cycloalkyl, and aryl where those terms have the meaning as defined above. Examples include $C(=O)$alkyl, $C(=O)$cycloalkyl, $C(=O)$aryl.

As used herein, the term "ester" means a group derived from an organic acid (—COOH) by substituting the hydroxy group (—OH) with alkoxy, where alkoxy has the meaning defined above. Examples include $C(=O)$Oalkyl, $C(=O)$Ocycloalkyl, $C(=O)$Oaryl, where alkyl, cycloalkyl, and aryl have the meanings defined above.

As used herein, the term "aldehyde" means a group derived from an organic acid (—COOH) by substituting the hydroxy group (—OH) with hydrogen. Examples include alkyl$C(=O)$H, cycloalkyl$C(=O)$H, aryl$C(=O)$H, and $C(=O)$H, where alkyl, cycloalkyl, and aryl have the meanings defined above.

As used herein, the term "alkylamide" means a group such as, $C(=O)$NHalkyl, $C(=O)$NH(cycloalkyl), $C(=O)$NH(aryl), $C(=O)$N(alkyl)(alkyl), $C(=O)$N(alkyl)(cycloalkyl), $C(O)$N(alkyl)(aryl), $C(=O)$N(cycloalkyl)(cycloalkyl), $C(=O)$N(cycloalkyl)(aryl), $C(=O)$N(aryl)(aryl), where alkyl, cycloalkyl, and aryl have the meanings defined above.

As used herein, the term "hydroxyalkyl" means an HO-alkyl-group or radical wherein alkyl has the meaning as defined above.

As used herein, the term "heterocyclic" means a cyclic hydrocarbon with at least one carbon substituted with a heteroatom. Examples include pyrrole, pyridyl, furfuyl, and the like.

As used herein, the term "alkene" or "alkylene" means an alkyl radical or group with one unit of unsaturation between adjacent carbons (a carbon-carbon double bond) having from 2 to 12 carbon atoms and includes, for example, ethenyl, 1-propenyl, 2-propenyl, 1-butenyl, 2-butenyl, 1-pentenyl, 2-pentenyl, 3-methyl-3-butenyl, 1-hexenyl, 2-hexenyl, 3-hexenyl, 3-heptenyl, 1-octenyl, 1-nonenyl, 1-decenyl, 1-undecenyl, 1-dodecenyl, and the like.

As used herein, the term "iron containing fuel additive" means ferrocene and ferrocene derivatives. Examples include dicyclopentadienyliron, di(methylcyclopentadienyl)iron, di(ethylcyclopentadienyl)iron, methylferrocene, ethylferrocene, propylferrocene, isopropylferroccene, n-butylferrocene, dihexylferrocene, phenylferrocene, m-tolylferrocene, didecylferrocene, dicyclohexylferrocene, and dicyclopentylferrocene. Other examples include dialkylaminomethylferrocene.

As used herein, the term "solid carrier" means a substance used in association with an iron containing fuel additive to aid in the application of the iron containing fuel additive. The term also means a material that is a solid below a temperature of 40° C. (a solid with a melting point above 40° C.) in that a one cubic inch of material will substantially sustain its shape under its own weight at 40° C. for a period of at least 24 hours. A solid carrier does not include polymeric materials, waxes, or paraffin waxes.

As used herein, the term "tablet" and "tablets" means a mass of material of any shape and may synonymously include pellets, pills, grains, dosing units, balls, spheres, cubes, and the like.

As used herein, the term "combustion additives" means any ingredient added to affect the storage, preservation, and use of fuels such as cetane improvers, antioxidants, stabilizers, combustion improvers, emission reducers, and the like.

As used herein, the term "hydrocarbon" means any aliphatic including alkyl, cycloalkyl, aryls, heteroaryl, whether branched or unbranched as well as linear and branched alkenes, cycloalkenes, and arylalkenes.

In accordance with this invention, the effectiveness of iron containing fuel additives is improved by formulating a composition to include an iron containing fuel additive and a solid carrier. The invention also includes processes for preparing a tablet form of an iron containing fuel additive for combining with various fuels such as gasoline or diesel fuel.

In one aspect, a composition is provided that may be added to a fuel. The composition includes an iron containing fuel additive and a solid carrier. In some examples, the composition consists of only these two constituents. In other examples, the composition may be augmented by other constituents such as combustion additives. The composition may be useful for forming tablet dosage forms.

In another aspect, a method is provided to form fuel additive tablets. In a first method, preparing the fuel additive tablet involves providing an iron containing fuel additive, providing a solid carrier, and combining the iron containing fuel additive and solid carrier to form a mixture. In some examples, the method may also involve compressing the mixture into a tablet. In some examples, the method may also involve reducing the mixture to a desirable particle size (conducive to compression or compaction) and compressing the mixture into a tablet. The order of any steps to carry out the process can vary and still results in an acceptable tablet. Particle sizes can range from 0.0001 mm to 3 mm.

In another aspect, a method is provided to form fuel additive tablets. Preparing the fuel additive tablet with this second technique involves providing an iron containing fuel additive, providing a solid carrier, melting the iron containing fuel additive, melting the solid carrier, combining the iron containing fuel additive and the solid carrier to form a mixture or a solution, and cooling the mixture or solution to produce a solid mixture or a solid solution. In some examples, the method may also involve forming the mixture into a tablet. In some examples, the method may also involve reducing the mixture to a desired particle size such as by pulverizing, grinding, or the like, followed by compressing the mixture into a tablet. In some examples, the cooling step is conducted in a shaped mold.

The tablet forms created by the processes of the invention can be useful in improving handling of iron containing fuel additives before mixing with a combustion fuel. The tablet forms also can be useful for enhancing dissolution in fuels more rapidly than the undiluted iron containing fuel additive itself.

Combustible Fuels

As required by a particular process or combustor, any suitable fuel can be treated or combined with a composition described herein. For example, the fuel may be an open flame fuel or a combustion fuel, such as blends of fuels, distillate fuels, including diesel fuel, e.g., No. 2 diesel fuel, gasoline, jet fuel, e.g., Jet A, or the like, and biologically-derived fuels, such as mono-alkyl ester based oxygenated fuel, i.e., fatty acid esters, triglycerides, soybean oil, Canola oil, and/or tallow. Other hydrocarbons including liquids, gases, e.g., natural gas or fuel derived from gases and/or emulsion components can be employed. Other examples of fuels include oil fired burner heating device fuels, such as kerosene, alcohols, oils, greases, and asphalts.

Iron Containing Fuel Additives

Examples of combustion catalysts include ferrocene and its derivatives represented by the formula:

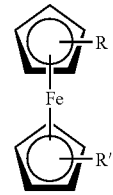

where each R and R' are independently selected from hydrogen, alkyl, cycloalkyl, aryl, alkoxy, ketone, ester, aldehyde, amide, hydroxyalkyl, or heterocyclic. Examples include, but are not limited to, dicyclopentadienyliron, di(methylcyclopentadienyl)iron, di(ethylcyclopentadienyl)iron, methylferrocene, ethylferrocene, propylferrocene, isopropylferroccene, n-butylferrocene, dihexylferrocene, phenylferrocene, m-tolylferrocene, didecylferrocene, dicyclohexylferrocene, and dicyclopentylferrocene. Other examples include dialkylaminomethylferrocene.

In some examples, the iron containing fuel additive may be a liquid, such as butylferrocene. In other examples, the iron containing fuel additive may be a solid.

Carrier

The solid carrier used in the compositions and methods described herein, include those carriers which are soluble in a fuel and are sufficient to release the additive or additives into the fuel. Furthermore, the carrier may include those which, when compressed, are capable of holding its shape in combination with the iron containing fuel additive. The carrier can also be compatible with mechanical elements used in burning or combusting fuels. The carrier can also be burned itself. Useful solid carriers include non-paraffinic hydrocarbons, a single oxygen-bearing hydrocarbon, and mixtures thereof. Examples of such carriers include biphenyl, 1-naphthol, 2-naphthol, diphenylmethane, hexadecanol, tritylalcohol, adamantane, terphenyl, p-tert-butylphenol, acenapthene, triphenylmethane. In some examples, the solid carrier is a single oxygen-bearing hydrocarbon such as an alcohol, ether, aldehyde, or ketone. In other examples, the solid carrier is an aromatic hydrocarbon. In some examples, the solid carrier is an unsaturated hydrocarbon such as linear and branched alkenes, cycloalkenes, and arylalkenes.

Carriers with high melting points, typically between 40 and 150° C. and which may be sparingly soluble in a fuel, are not desirable. Time release or sustained release carriers are not desirable. Waxes can compromise the burn rate of a fuel, possibly affecting engine performance in combustion applications. Waxes can also serve as nucleation sites and accumulate, even occlude mechanical passageways, especially in cold climate conditions.

The solid carrier may also be in the form a binary, ternary, etc. mixtures. These mixtures may include one or more non-paraffinic hydrocarbons, a single oxygen-bearing hydrocarbons, and mixtures thereof, such as the mixture formed when using both adamantane and biphenyl. In some examples, the carrier can also serve a duel function as being another additive itself.

In one aspect, the selection of solid carrier can be directed to maximizing the melting point of the composition while maintaining an adequate solvation in a fuel. For example, a high melting point enables the iron containing fuel additive and compositions with the same to be handled in hot environments.

Other Additives

Additional additives may be added to the compositions. One such additive can be a dye. An acceptable dye can be any dye that provides a distinctive color to the composition that might allow an observer to distinguish the composition from other materials or that the composition is present in fuel.

Another such additive can be a detergent/dispersant. An acceptable detergent/dispersant can be any detergent/dispersant that assist in removing residue from mechanical parts in contact with fuel. Examples include polyisobuteneamines which are obtainable, according to EP-A 244 616, by hydroformylation of highly reactive polyisobutene and subsequent reductive amination with ammonia, monoamines or polyamines, such as dimethyleneaminopropylamine, ethylenediamine, diethylenetriamine, triethylenetetramine or tetraethylenepentamine; (b) poly(iso)buteneamines which are obtainable by chlorination of polybutenes or polyisobutenes having double bonds predominantly in the β and γ position and subsequent amination with ammonia, monoamines or the abovementioned polyamines; (c) poly(iso)buteneamines which are obtainable by oxidation of double bonds in poly (iso)butenes with air or ozone to give carbonyl or carboxyl compounds and subsequent amination under reducing (hydrogenating) conditions; (d) polyisobuteneamines which are obtainable, according to DE-A 196 20 262, from polyisobutene epoxides by reaction with amines and subsequent dehydration and reduction of the aminoalcohols; (e) if required, hydroxyl-containing polyisobuteneamines which are obtainable, according to WO-A 97/03946, by reaction of polyisobutenes having an average degree of polymerization P of from 5 to 100 with nitrogen oxides or mixtures of nitrogen oxides and oxygen and subsequent hydrogenation of these reaction products; (f) hydroxyl-containing polyisobuteneamines which are obtainable, according to EP-A 476 485, by reaction of polyisobutene epoxides with ammonia, monoamines or the abovementioned polyamines; (g) polyetheramines which are obtainable by reaction of C2- to C30-alkanols, C6- to C30-alkanediols, mono- or di-C2- to C30-alkylamines, C1- to C30-alkylcyclohexanols or C1- to C30-alkylphenols with from 1 to 30 mol of ethylene oxide and/or propylene oxide and/or butylene oxide per hydroxyl or amino group and subsequent reductive amination with ammonia, monoamines or the abovementioned polyamines, it also being possible to use polyetheramines having a carbamate structure; and, (h) "polyisobutene Mannich bases" which are obtainable, according to EP-A 831 141, by reaction of polyisobutene-substituted phenols with aldehydes and monoamines or the abovementioned polyamines. Conventional dispersants are, for example, imides, amides, esters and ammonium and alkali metal salts of polyisobutenesuccinic anhydrides, which are used in particular in lubricating oils, but some of which are also used as detergents in fuel compositions.

Yet another additive can be an antioxidant. An acceptable antioxidant can be any antioxidant that provides protection against reaction of the fuel prior to burning. Examples include phenolic antioxidants, amine antioxidants, sulfurized phenolic compounds, and organic phosphites among others. Examples also include hindered phenolic compounds such as 2,6-di-tert-butylphenol, 4-methyl-2,6-ditertbutylphenol, 2,4-di-methyl-6-tert-butyl phenol, 4,4'-methylenebis(2,6-di-tert-butyl phenol), and mixed methylene bridged polyalkyl phenols. Further examples include aromatic amine compounds such as the cycloalkyl-di-alkyl amines and phenylenediamines.

Still another additive can be a demulsifier. An acceptable demulsifier can be any demulsifier that provides to destabilize emulsions. Examples include organic sulfonates, polyoxyalkylene glycols, and oxyalkylated alkylphenolic resins, and the like.

Another additive can be a corrosion inhibitor. An acceptable corrosion inhibitor can be any corrosion inhibitor that retards or stops chemical reactions that degrade mechanical parts in contact with a fuel. Examples include dimmer and trimer acids, such as are produced from tall oil fatty acids, oleic acid, linoleic acid, or the like. Other examples include alkenyl succinic acid and alkenyl succinic anhydride such as tetrapropenyl succinic acid, tetrapropenylsuccinic anhydride, tetradecenylsuccinic acid, tetradecenylsuccinic anhydride, hexadecenylsuccinic acid, hexadecenylsuccinic anhydride, and the like. Still other examples include the half esters of alkenyl succinic acids having 8 to 24 carbon atoms in the alkenyl group with alcohols such as the polyglycols.

Proportions

The amount of any iron containing fuel additive and solid carrier, as well as any other additive may vary depending upon the needs and conditions associated with the fuel and its use. Generally, the additives may be blended or otherwise mixed at any suitable ratio to give a desired release rate when the composition is placed in contact with a fuel. Typically, ratios of iron containing fuel additive to solid carrier can be at a ratio of from about 9:1 to about 1:500. In some examples, the ratio of iron containing fuel additive to carrier is from about 1:50 to about 1:10. A test to determine the visual clarity (a measure of solubility) of the composition in a fuel involves addition of 0.3 g to 1.0 g of a pelletized material to a glass vessel and visual observation as to whether solid particles are present after a specified period of time, for example, 30 minutes.

The relative proportion of the fuel additive in the composition may be expressed in terms of weight percent. In some examples, the composition includes less than about 90% iron containing fuel additive. In other examples, the composition includes less than about 70% iron containing fuel additive. In still other examples, the composition includes less than about 50% iron containing fuel additive. In more examples, the composition includes less than about 30% iron containing fuel additive. In additional examples, the composition includes less than 15% iron containing fuel additive. In still more examples, the composition includes less than 10% iron containing fuel additive. In even more examples, the composition includes less than 7% iron containing fuel additive. In even other examples, the composition includes less than 5% iron containing fuel additive. In yet other examples, the composition includes less than about 3% iron containing fuel additive. In yet more examples, the composition includes less than about 1% iron containing fuel additive.

The relative proportion of the iron containing fuel additive once dissolved in a fuel stream can vary. In some examples, the amount of iron containing fuel additive is less than about 1000 ppm. In other examples, the amount of iron containing fuel additive is less than about 650 ppm. In still other examples, the amount of iron containing fuel additive is less than about 450 ppm. In more examples, the amount of iron containing fuel additive is less than about 250 ppm. In additional examples, the amount of iron containing fuel additive is less than about 100 ppm. In still more examples, the amount of iron containing fuel additive is less than about 50 ppm. In even more examples, the amount of iron containing fuel additive is between about 10 and about 30 ppm.

Solvation

In another aspect, the compositions including an iron containing fuel additive and solid carrier improve solvation rates compared to the iron containing fuel additive alone or when compared to time release or sustained release materials. Rapid solvation may be desirable when fueling a vehicle, or other combustion engine for homogeneous blending of the iron containing fuel additive and/or other additive. In some examples, the composition can substantially dissolve within 60 minutes. In other examples, the composition can substantially dissolve within 30 minutes. In still other examples, the composition can substantially dissolve within 15 minutes. In still more examples, the composition can substantially dissolve within 12 minutes. In even more examples, the composition can substantially dissolve within 10 minutes. In additional examples, the composition can substantially dissolve within 7 minutes. In more examples, the composition can substantially dissolve within 5 minutes. In even more examples, the composition can substantially dissolve within 3 minutes.

EXAMPLES

The present invention is illustrated by the following Examples. It is to be understood, however, that the instant Examples are offered by way of illustration of the invention and are not to be construed in any manner as limitations thereof. It is also to be understood, that where designated, some examples are prophetic.

Example 1

In a container, 0.22 g of ferrocene and 2 g of biphenyl were added and heated to approximately 70° C. The mixture was stirred until dissolution. The hot solution was poured into ceramic, pellet-shaped molds and allowed to cool to room temperature. After cooling, the pellet-shaped material was removed and each pellet weighed approximately half a gram.

Example 2

In a container, 0.22 g of ferrocene and 2 g of 1-naphthol were added and heated to approximately 95° C. The mixture was stirred until dissolution. The hot solution was poured into ceramic, pellet-shaped molds and allowed to cool to room temperature. After cooling, the pellet-shaped material was removed and each pellet weighed approximately 0.3 g.

Example 3

In a container, 0.3 g of ferrocene, 1.8 g of hexadecanol, and 1.8 g of adamantane were added and heated to approximately 90° C. The mixture was stirred until dissolution. The hot solution was poured into ceramic, pellet-shaped molds and allowed to cool to room temperature. After cooling, the pellet-shaped material was removed and each pellet weighed approximately 1.1 g.

Example 4

In a container, 0.27 g of ferrocene, 2.0 g of hexadecanol, and 1.0 g of adamantane were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 0.5 g.

Example 5

In a container, 0.25 g of ferrocene, 1.6 g of biphenyl, and 1.9 g of triphenylmethanol were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 0.6 g.

Example 6

In a container, 0.35 g of ferrocene, 2.7 g of biphenyl, and 0.3 g of triphenylmethanol were added and heated to approximately 90° C. The mixture was stirred until dissolution. The hot solution was poured into ceramic, pellet-shaped molds and allowed to cool to room temperature. After cooling, the pellet-shaped material was removed and each pellet weighed approximately 0.5 g.

Example 7

In a container, 0.68 g of ferrocene, 2.7 g of biphenyl, and 0.3 g of triphenylmethanol were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 0.8 g.

Example 8

In a container, 0.44 g of ferrocene and 8.8 g of acenaphthene were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.1 g.

Example 9

In a container, 0.54 g of ferrocene and 10.4 g of butylphenol were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.2 g.

Example 10

In a container, 0.46 g of ferrocene and 9.2 g of terphenyl were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.0 g.

Example 11

In a container, 0.64 g of ferrocene and 12.7 g of biphenyl were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 1.9 g.

Example 12

In a container, 0.59 g of ferrocene, 0.4 g of acenapthene, and 1.1 g of butylphenol were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.2 g.

Example 13

In a container, 0.5 g of ferrocene, 0.87 g of butylphenol, and 8.8 g of terphenyl were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.2 g.

Example 14

In a container, 0.49 g of ferrocene, 1.1 g of terphenyl, and 8.6 g of biphenyl were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 2.1 g.

Example 15

In a container, 1.3 g of ferrocene and 18.7 g of biphenyl were added and heated to approximately 75° C. The mixture was stirred until dissolution. The hot solution was poured into ceramic, pellet-shaped molds and allowed to cool to room temperature. After cooling, the pellet-shaped material was removed and each pellet weighed approximately 2.1 g.

Example 16

In a container, 1.3 g of ferrocene and 18.7 g of biphenyl were added and heated to approximately 75° C. The mixture was stirred until dissolution. The hot solution was cooled to room temperature. Solid was pulverized to a fine powder. Some of this power was compressed into tablets containing approximately 1000 mg total weight.

Example 17

In a container, 5 g of ferrocene and 78 g biphenyl were added and heated to approximately 75° C. The mixture was stirred until dissolution. The hot solution was poured into agitated cold water (500 mL). Solid was filtered, dried and pulverized to a fine powder. Some of this powder was compressed into tablets containing approximately 1000 mg total weight.

Example 18

In a container, 0.30 Kg of ferrocene and 4.8 g of biphenyl were added and heated to approximately 80° C. The mixture was stirred until dissolution. The hot solution was poured into 5 gal. agitated cold water. The solid was filtered, dried and pulverized to a fine powder. This powder was compressed into about 6000 tablets containing approximately 800 mg total weight Example 19

In a mortar, 1.3 g of ferrocene and 18.7 g of biphenyl were added, followed by pulverizing and mixing the components into a fine powder. The resulting powder was poured into pellet-shaped molds and compressed. After compression, the pellet-shaped material was removed and each pellet weighed approximately one gram.

Comparative Examples

Example 20

An additional comparative example 20 was examined. A 1 gram tablet of ferrocene was obtained from Chemplex Automotive Group, Inc., Fullerton Calif. The tablet was added to 500 mL of gasoline. Approximately half of the table was observed to dissolve after 60 minutes. Therefore, it was observed a 1 gram tablet of ferrocene itself does not dissolve in less than 60 minutes.

Example 21

An additional comparative example 21 was examined. In a container, 0.26 g of ferrocene, 1.4 g of hexadecanol, and 1.4 g of wax were added and heated to approximately 80° C. The mixture was stirred until dissolution. The hot solution was poured into ceramic, pellet-shaped molds and allowed to cool to room temperature. After cooling, the pellet-shaped material was removed and each pellet weighed approximately 0.4 g.

Prophetic Examples

Example 22

In a container, 0.22 g of acetylferrocene can be added with 2 g of biphenyl then heated to approximately 70° C. This mixture can be stirred until dissolution. The hot solution can be poured into ceramic molds giving 4 solid pellets of approximately one-half gram each.

Example 23

In a container, 0.22 g of ethylferrocene can be added with 2 g of biphenyl then heated to approximately 70° C. This mixture can be stirred until dissolution. The hot solution can be poured into ceramic molds giving 4 solid pellets of approximately one-half gram each.

Example 24

In a container, a volume of butylferrocene constituting 5% by weight can be added with a mass of biphenyl constituting 95% by weight. The combination can then be heated to approximately 70° C. The hot solution can be poured into ceramic molds giving solid pellets of approximately one-half gram each. Alternatively, the hot solution can cooled and the material pulverized for compaction into a pellet.

Solvation Studies

Pellets from each of the above-described examples were studies for time of solvation in gasoline. Gasoline was obtained from a gas station in Utah during a summer month. A single sample pellet was then added to 500 mL of gasoline and observed until the tablet was dissolved. Table I displays the time observed for complete salvation of the pellet. Pellets were of various sizes from less than 1 gram to more than 1 gram.

TABLE I

| Solid Pellets: | Time to dissolve in 500 mL of gasoline |
| --- | --- |
| Pellet from Example 1 | 2 min 20 sec |
| Pellet from Example 2 | ~30 min |
| Pellet from Example 3 | 6 min 30 sec |
| Pellet from Example 4 | 3 min 50 sec |
| Pellet from Example 5 | ~6 min |
| Pellet from Example 6 | 3 min 20 sec |
| Pellet from Example 7 | 2 min 45 sec |
| Pellet from Example 8 | 7 min |
| Pellet from Example 9 | 21 min |
| Pellet from Example 10 | 10 min 40 sec |
| Pellet from Example 11 | 3 min 25 sec |
| Pellet from Example 12 | 6 min |
| Pellet from Example 13 | 10 min |
| Pellet from Example 14 | 3 min 10 sec |
| Pellet from Example 15 | 3 min |
| Pellet from Example 16 | 4 min |
| Pellet from Example 17 | 6 min |
| Pellet from Example 18 | 6 min |
| Pellet from Example 19 | 4 min 10 sec |
| Pellet from Example 20 | >60 minutes |
| Pellet from Example 21 | ~50 min |

Melting Point Study

Melting points were observed for various combinations of a composition involving ferrocene and biphenyl. Table II provides summary of the observations where the composition is expressed as a percent by weight of ferrocene and the balance being biphenyl. Melting points were determined using a Mel-temp capillary melting point apparatus. Both start and end points are reported in the table.

TABLE II

| % Ferrocene | Melting point ° C. start | Melting point ° C. finish |
| --- | --- | --- |
| 0 | 68.2 | 69.9 |
| 4.8 | 63.8 | 67.2 |
| 6.5 | 62.8 | 66.4 |
| 9.9 | 60.6 | 64.4 |
| 15.1 | 60.3 | 62.7 |
| 20.8 | 59.7 | 60.8 |
| 25.2 | 59.9 | 76.6 |
| 50.2 | 60.2 | 126.7 |
| 100 | 172.9 | 174.2 |

While the invention has been described with respect to various specific examples and embodiments, it is to be understood that the invention is not limited thereto and that it can be variously practiced with the scope of the following claims.

What is claimed is:

1. A composition comprising:
   (a) a fuel soluble ferrocene compound; and
   (b) a fuel soluble solid carrier selected from biphenyl.

2. The composition according to claim 1, wherein the fuel soluble ferrocene compound is selected from one or more compounds of the formula:

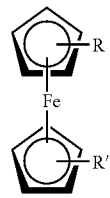

wherein each of R and R' are independently selected from hydrogen, alkyl, cycloalkyl, aryl, alkylene, alkoxy, ketone, ester, aldehyde, amide, hydroxyalkyl, or heterocyclic.

3. The composition according to claim 2, wherein the fuel soluble ferrocene compound is unsubstituted ferrocene.

4. The composition according to claim 2, wherein the fuel soluble ferrocene compound is a substituted ferrocene.

5. The composition according to claim 2, further comprising one or more additional fuel soluble ferrocene compounds.

6. A method of preparing a fuel additive comprising:
   combining a fuel soluble ferrocene compound and a fuel soluble solid carrier selected from biphenyl.

7. The method according to claim 6, wherein the fuel soluble ferrocene compound is unsubstituted ferrocene.

8. A method of supplementing a fuel comprising:
   adding a fuel additive composition to the fuel, the fuel additive composition comprising:
   (a) a fuel soluble ferrocene compound; and
   (b) a fuel soluble solid carrier selected from biphenyl.

9. The method according to claim 8, wherein the fuel soluble

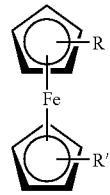

ferrocene compound is selected from one or more compounds of the formula:
   wherein each of R and R' are independently selected from hydrogen, alkyl, cycloalkyl, aryl, alkylene, alkoxy, ketone, ester, aldehyde, amide, hydroxyalkyl, or heterocyclic.

10. The method according to claim 9, wherein the fuel soluble ferrocene compound is unsubstituted ferrocene.

11. The method according to claim 9, wherein the fuel soluble ferrocene compound is a substituted ferrocene.

12. The method according to claim 8, further comprising one or more additional ferrocene compounds.

13. The method of claim 9, wherein the composition is in the form of a tablet.

14. A composition consisting essentially of:
   (a) a fuel soluble ferrocene compound; and
   (b) a fuel soluble solid carrier selected from biphenyl.

* * * * *